United States Patent [19]
Dao et al.

[11] Patent Number: 5,283,888
[45] Date of Patent: Feb. 1, 1994

[54] VOICE PROCESSING INTERFACE UNIT EMPLOYING VIRTUAL SCREEN COMMUNICATIONS FOR ACCESSING A PLURALITY OF PRIMED APPLICATIONS

[75] Inventors: Vinh D. Dao, Cupertino; Jeffrey A. Kusnitz, Sunnyvale, both of Calif.

[73] Assignee: International Business Machines Corporation, Armonk, N.Y.

[21] Appl. No.: 750,671

[22] Filed: Aug. 27, 1991

[51] Int. Cl.$^5$ .................... G06F 13/00; G06F 3/00
[52] U.S. Cl. .................... 395/500; 395/800; 364/222.2; 364/228.2; 364/228.4; 364/232.1; 364/237.2; 364/237.3; 364/242.94; 364/260.4; 364/280.2; 364/280.6; 364/281.4; 364/281.7; 364/284.4; 364/286.3; 364/DIG. 1; 364/931.43; 364/974.2
[58] Field of Search .............. 395/650, 325, 275, 800, 395/500; 364/200, 222.2, 228.2, 228.4, 232.1, 237.2, 237.3, 242.94, 260.4, 280.2, 280.6, 281.4, 281.7; 371/16, 11.2; 370/58.1

[56] References Cited

U.S. PATENT DOCUMENTS

| | | | |
|---|---|---|---|
| 3,421,150 | 1/1969 | Quosig et al. | 395/650 |
| 4,331,835 | 5/1982 | Gueldner et al. | 178/3 |
| 4,513,373 | 4/1985 | Sheets | 395/275 |
| 4,742,447 | 5/1988 | Duvall et al. | 395/375 |
| 4,802,164 | 1/1989 | Fukuoka et al. | 371/16 |
| 4,949,254 | 8/1990 | Shorter | 395/700 |
| 4,975,914 | 12/1990 | Ashton et al. | 371/11.2 |
| 4,982,421 | 1/1991 | Kirsch et al. | 379/216 |
| 4,991,089 | 2/1991 | Shorter | 395/650 |
| 4,994,963 | 3/1991 | Rorden et al. | 395/325 |
| 4,996,685 | 2/1991 | Farese et al. | 370/58.1 |
| 5,012,466 | 4/1991 | Buhrke et al. | 370/62 |
| 5,043,881 | 8/1991 | Hamazaki et al. | 364/200 |
| 5,062,037 | 10/1991 | Shorter et al. | 395/325 |
| 5,063,500 | 11/1991 | Shorter | 364/200 |
| 5,121,486 | 6/1992 | Kurihara et al. | 395/325 |

*Primary Examiner*—Alyssa H. Bowler
*Assistant Examiner*—Meng-Ai T. An
*Attorney, Agent, or Firm*—Perman & Green

[57] ABSTRACT

A method and system is described for enabling rapid access from voice-responsive interface processor to applications running on a plurality of connected host processors, each host processor using screens to communicate with the interface processor. The method is performed by the interface processor and includes the steps of: establishing virtual terminal session with each host processor that initializes applications on the host processor and places them in an idle state, awaiting further commands; responding to a user's request that requires one such application by accessing a virtual terminal session in existence with the host processor on which the application is running, entering user data in a screen from the application stored by the interface processor, and transmitting the screen with its entered data to the host processor, whereby the host processor immediately processes the screen; and transmits a new screen to the interface processor, the new screen containing data for the user. The interface processor then finds the data in the new screen and transmits it, via a voice interface, to the user.

10 Claims, 4 Drawing Sheets

PREPARATION/TRAINING

```
┌─────────────────────────────────────────┐
│ IDENTIFY TYPES OF HOST APPLICATIONS,    │─── 50
│ CONNECTION TYPES, CAPACITIES ETC.       │
└─────────────────────────────────────────┘
                    ↓
┌─────────────────────────────────────────┐
│ FOR EACH APPLICATION, DEFINE:           │
│ LOG-IN & LOG-OUT PROCEDURES             │─── 52
│ NUMBER OF SESSIONS                      │
│ REFRESH PROCEDURE                       │
└─────────────────────────────────────────┘
                    ↓
┌─────────────────────────────────────────┐
│ SAVE CONFIGURATION DATA                 │─── 54
└─────────────────────────────────────────┘
```

OPERATION

INITIALIZATION TIME

```
┌─────────────────────────────────────────┐
│ -EXEC CONTROLLER STARTS LOG IN          │
│  PROCEDURE FOR ALL SESSIONS             │─── 56
│ -RECORD SESSION STATUS'S IN             │
│  SESSION CONTROL TABLE                  │
└─────────────────────────────────────────┘
```

RUN TIME

```
┌─────────────────────────────────────────┐
│ EXEC CONTROLLER                         │
│  -PERFORMS REFRESH PROCEDURES           │─── 58
│      (IF NEEDED)                        │
│  -ALLOCATES FREE SESSIONS               │
└─────────────────────────────────────────┘
                    ↓
┌─────────────────────────────────────────┐
│ VPU RECEIVES USER INQUIRY               │─── 60
└─────────────────────────────────────────┘
                    ↓
                   (A)
```

FIG. 3

VOICE PROCESSING INTERFACE UNIT EMPLOYING VIRTUAL SCREEN COMMUNICATIONS FOR ACCESSING A PLURALITY OF PRIMED APPLICATIONS

FIELD OF THE INVENTION

This invention relates to voice processing and response units, and more particularly, to a voice processing and response unit for accessing a plurality of connected host processors, each having one or more applications in a primed state, ready to respond to an inquiry.

BACKGROUND OF THE INVENTION

Voice-based processing systems respond to user-telephoned inquiries by providing an intelligible voice response that provides requested information. Some transactions which are now performed on voice-based processing systems are:

- The caller is requested to provide an account number via the telephone keypad, at which point, the processor employs the account number to find an account balance and returns the balance to the caller;
- The system provides a caller with information such as current interest rate;
- The system enters information from the caller into a data base, such as the status of a sales order or a repair call;
- The system places outgoing calls, automatically, for service orders or appointments, using data from a host computer.

Most voice-based processing systems employ an interface processor which includes a voice processing unit (VPU). A VPU replaces a human intermediary between the telephone and a host processor. One such prior art VPU is the IBM 9270 which communicates with its host processor through the vehicle of screen transactions. In specific, when the VPU receives an inquiry from a user, its associated processor requests a "screen" of data from a connected host processor, which screen includes the requested data.

A screen is a pixel image prepared by application software in the host processor in response to an inquiry. The screen is supplied to the VPU and its associated processor for the purpose of providing an answer in response to the user's inquiry.

In order to speed up a host processor's responses to user initiated inquiries, the prior art has employed the concept of "priming" applications running on a host processor. In U.S. Pat. No. 4,949,254 to Shorter, assigned to the same assignee as this application, a method is disclosed for allowing a host processor to establish within itself a number of virtual machines, each of which possesses a "primed" application. Shorter positions a "pool manager" within the host computer which acts to start a plurality of applications so that they are immediately ready when a request for access is received. This procedure avoids the log-in delays which occur when an application is initialized. After the applications are primed, each virtual machine within the host processor goes into an "idle" state and awaits a user to request the initiation of a session. Shorter also describes an algorithm for allocating virtual machines within the processor to assume that sufficient primed applications are available for the anticipated level of requests.

In order for the Shorter system to function, modifications must be made to the software operating system of the host processor to enable the establishment of the virtual machines. It is often desirable that a VPU operate in conjunction with a plurality of host processors which are not necessarily compatible at the operating system level. The Shorter system, in such an arrangement, requires that each host processor's operating system be altered. This is not only an expensive proposition, but it is often resisted by the owners of host processors for fear that any change to the operating system will alter other unrelated functions running on the host.

In addition to being able to access multiple hosts, a VPU should also be capable of handling multiple host sessions with different applications, in response to a single phone call. Likewise, a VPU should be able to map, via a virtual session, an incoming inquiry to any available host processor that contains a primed application capable of responding to the incoming request. Prior art describing various virtual session and machine arrangements can be found in the following U.S. Pat. No. 4,982,421 to Kirsch et al; U.S. Pat. No. 4,331,835 to Gueldner et al.; U.S. Pat. No. 5,012,466 to Buhrke et al; and U.S. Pat. No. 4,742,447 to Duvall et al.

Accordingly, it is an object of this invention to provide a voice processing interface system which enables access to a plurality of host processors, without requiring modification to the operating systems of those host processors.

It is an other object of this invention to provide a voice processing interface unit which enables a plurality of host sessions to be established in response to a single telephone inquiry.

It is still another object of this invention to provide a voice processing interface unit which employs screen interface communications with a plurality of host processors.

SUMMARY OF THE INVENTION

A method and system is described for enabling rapid access from voice-responsive interface processor to applications running on a plurality of connected host processors, each host processor using screens to communicate with the interface processor. The method is performed by the interface processor and includes the steps of: establishing virtual terminal sessions with each host processor that initializes applications on the host processor and places them in an idle state, awaiting further comands; responding to a user's request that requires one such application, by accessing a virtual terminal session in existence with the host processor on which the application is running, entering user data in a screen from the application stored by the interface processor, and transmitting the screen with its entered data to the host processor, whereby the host processor immediately processes the screen; and transmits a new screen to the interface processor, the new screen containing data f or the user. The interface processor then finds the data in the new screen and transmits it, via a voice interface, to the user.

DESCRIPTION OF THE DRAWING

FIGS. 3 and 4 illustrate a high level flow diagram that describes the operation of the invention.

DETAILED DESCRIPTION OF THE INVENTION

Figure 1:
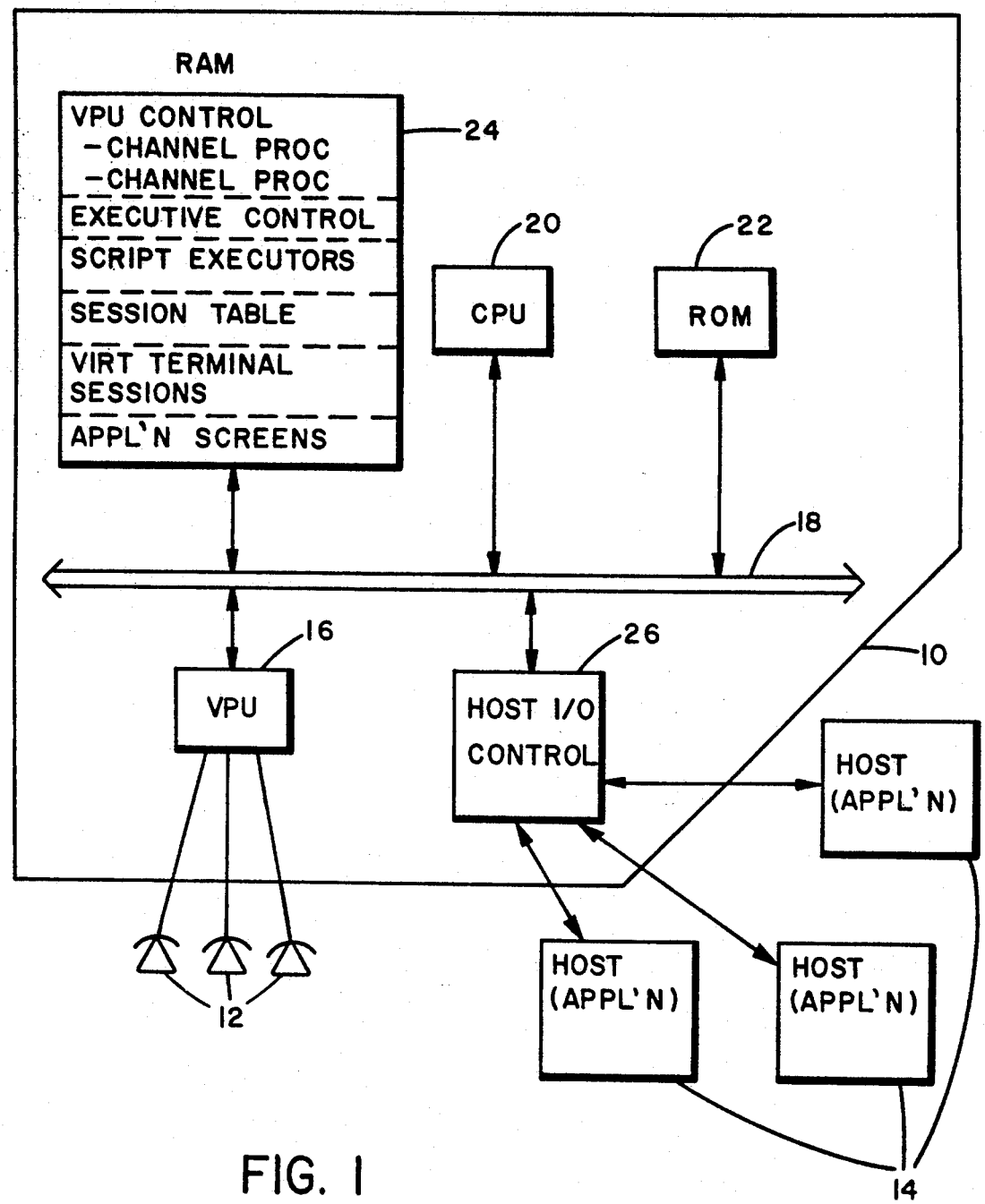
FIG. 1 is a high level block diagram of a system embodying the invention.

Referring to FIG. 1, a block diagram is shown of a system configured in accordance with the invention. Interface processor 10 is a multitasking computer that is adapted to act as an interface between a plurality of telephone handsets 12 and a plurality of host computers 14. Each telephone handset 12 provides an input capability whereby a user may provide data to interface processor 10 and receive voice responses therefrom. Each host processor 14 includes one or more applications which, for instance, may cover brokerage, insurance, banking, and other database functions.

Each telephone handset 12 is connected to a voice processing unit 16 which is, in turn, coupled to a bus 18. A central processing unit 20 also communicates with bus 18 as does a ROM 22. A random access memory (RAM) 24 contains, among other data, a plurality of program modules which enable the operation of the invention. These program modules include: a session and executor control module; a voice processing unit control module (including a channel process submodule for each input telephone line); a script executor for each input telephone line; a session table that provides a complete updated status of a plurality of virtual terminal sessions in effect between interface processor 10 and host computers 14; and a virtual terminal emulation module. The function of each of the modules will be considered in detail below.

One skilled in the art will realize that the block diagram of interface processor 10 shown in FIG. 1 is schematic and shows the processor at its highest functional level. Interface processor 10, as indicated above, requires multitasking capabilities. A processor capable of performing the functions for interface processor 10 is the IBM RISC System/6000.

To enable an initial understanding of the invention, its functions will be briefly described, followed by a detailed description of each of the software modules and their functions. Initially, interface processor 10 establishes through a host I/O control module 26, a plurality of virtual terminal sessions with host processors 14. One or more virtual terminal sessions may be established with each host processor. Each virtual terminal session is initiated, and log-on procedures are accomplished with the applications in each host processor. At that point, each application is in an "idle" state and awaits a next event.

Each host processor communicates with interface processor 10 via the transmission and reception of screens. In this manner, each host processor 14 sees interface processor 10 as a number of remote terminals and interacts with it in such a manner. This enables each host processor to function independently and no modifications are required to their operating systems. Periodically, interface processor 10 may be required to perform a "refresh" action for each application if a timeout period occurs and no inquiries have been received by the host to bring the idle application session into activity.

Once the virtual sessions have been established, interface processor 10 awaits an inquiry. Upon receiving a telephone inquiry from a user, voice processing unit 16 receives the inputted data from the user's telephone keypad and passes it to CPU 20 where a number of determinations are made. First, a decision is made as to which application is required to respond to the inquiry. Second, a review of the session table in RAM 24 occurs to determine which virtual sessions are available and third, an available virtual session (with the required application) is assigned to the inquiry.

At this point, an initial screen from the connected virtual session application (that is stored in RAM 24) is accessed, and the user's data is entered into the screen. The screen with the user's data is transmitted by host I/O control unit 26 to the particular host processor handling the application. The host processor then returns a new screen with the requested data, which screen is stored in RAM 24. The data is then accessed and provided via voice processing unit 16 to the user through a voice response mechanism.

From the above, it can be seen that a plurality of applications are in a "primed" state, awaiting an inquiry from interface processor 10. A received user inquiry is mapped to an available application. In addition, a user, in a single telephone call, may make a number of separate inquiries. In response, interface processor 10 accesses a plurality of primed virtual terminal sessions with host processors that contain applications required to respond to the user's inquiries. Thus, multiple responses can be provided, eliminating the need for the user to make repeat phone calls. In addition, the use of screen interfaces enables interface processor 10 to communicate with different types of host processors that have differing operating system software. Such a communication method, when used in combination with the primed applications, provides extremely fast response times to user inquires.

Figure 2:
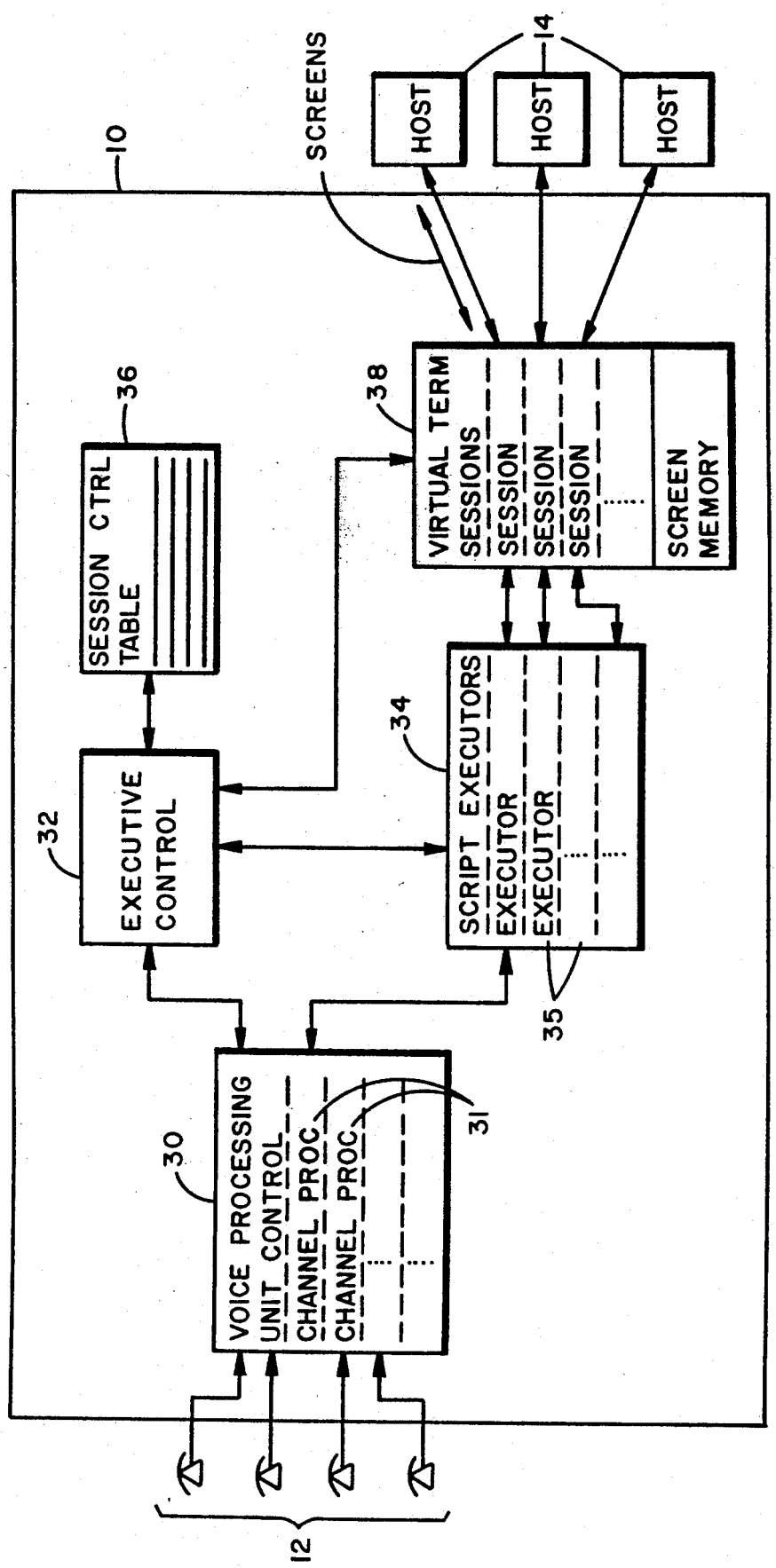
FIG. 2 is a block diagram illustrating the various software modules that implement the invention.

Turning now to FIG. 2, major software modules (and their interrelationships) are shown that operate interface processor 10. Voice processing unit (VPU) control module 30 is the software whose responsibility it is to interact with the user/caller and to assure overall operation of the invention. It comprises a plurality of channel process submodules 31, one for each incoming telephone line. A channel process submodule 31 plays a message to the user that instructs the user to insert, via the telephone's keypad, input data to allow the inquiry to be identified and the required data to be determined. In addition, a channel process submodule receives answers and converts them to a voice response to be played back over the telephone line to the user. VPU control module 30 thus controls the telephony aspect of the system, i.e. assigning channel processes to incoming telephone calls and assuring that the various software modules interact properly to provide a response for the user. Executive control module 32 manages session control table 36 and all the script executors 34. Executive control module 32 assures that refresh procedures are performed during each virtual terminal session to maintain the applications in the connected hosts in their primed states and further controls the use of session control table 36.

A script executor module 34 includes a plurality of executor submodules 35. A submodule 35 is assigned to a channel process submodule 31 when the channel process submodule becomes active. Each executor submodule 35 performs the functions that would normally be performed by an operator sitting in front of a terminal display, i.e., inserting data into a screen and responding to screen information from a connected host and passing the information on to the user. Thus, each executor submodule 35 executes a script, interacts with a host virtual terminal session, and provides an interface function.

An Executor submodule 35 is designed to execute multiple scripts which are user-programmable. Further, one executor submodule 35 can interact directly with a plurality of active host sessions/screens or applications simultaneously. A script is a set of commands that describes the actions to be taken by an executor 35. One simple script tells an executor 35 to read a data field in a received screen and return the data to VPU control module 30. Another script may instruct an executor to look at several screens and transfer data from one screen to another. Another script operation is to extract a whole screen from one host session and transfer it directly into the screen of another host session. This approach has many applications in transaction-oriented environments. In summary, executor submodule 35 has the ability to execute user-defined scripts; can interact with multiple host screens; and can serve as a bridge or a switch between two or more host sessions.

When executive control module 32 is informed by a channel process submodule 31 that an inquiry has been received, it assigns an executor submodule 35 to the channel process submodule 31. The channel process submodule 31 then provides to the executor submodule 35 user input data that is required to begin the inquiry/response function. The assigned executor module 35 then causes a session control table 36 (via executive control module 34 to be examined), to determine which session amongst the pool of all sessions is available and also has connected to it a correct application. Executive control module 32 then assigns an available virtual session to the executor submodule 35 which, in turn, contacts virtual terminal session module 38 to gain control of the virtual terminal session.

Once control of the session is transferred, the executor submodule 35 accesses an initial screen from the application (that is already stored in screen memory 40) and inserts the user's data thereinto. The executor submodule 35 then causes the screen data to be transmitted, over the controlled virtual session, to the connected host for processing. After processing, the host returns a new screen that includes the data required to respond to the user's inquiry. In copending U.S. patent application Ser. No. 07/750,673, entitled Automatic Location of Screen objects through the Use of Relational Positional Data to Dao et al., assigned to the same Assignee as this invention, a preferred method is described for locating such data in a returned screen.

Once the required data has been located, it is transferred to the assigned channel process submodule 31 in VPU control module 30 where it is converted to a voice response and played back to the user.

Figure 4:
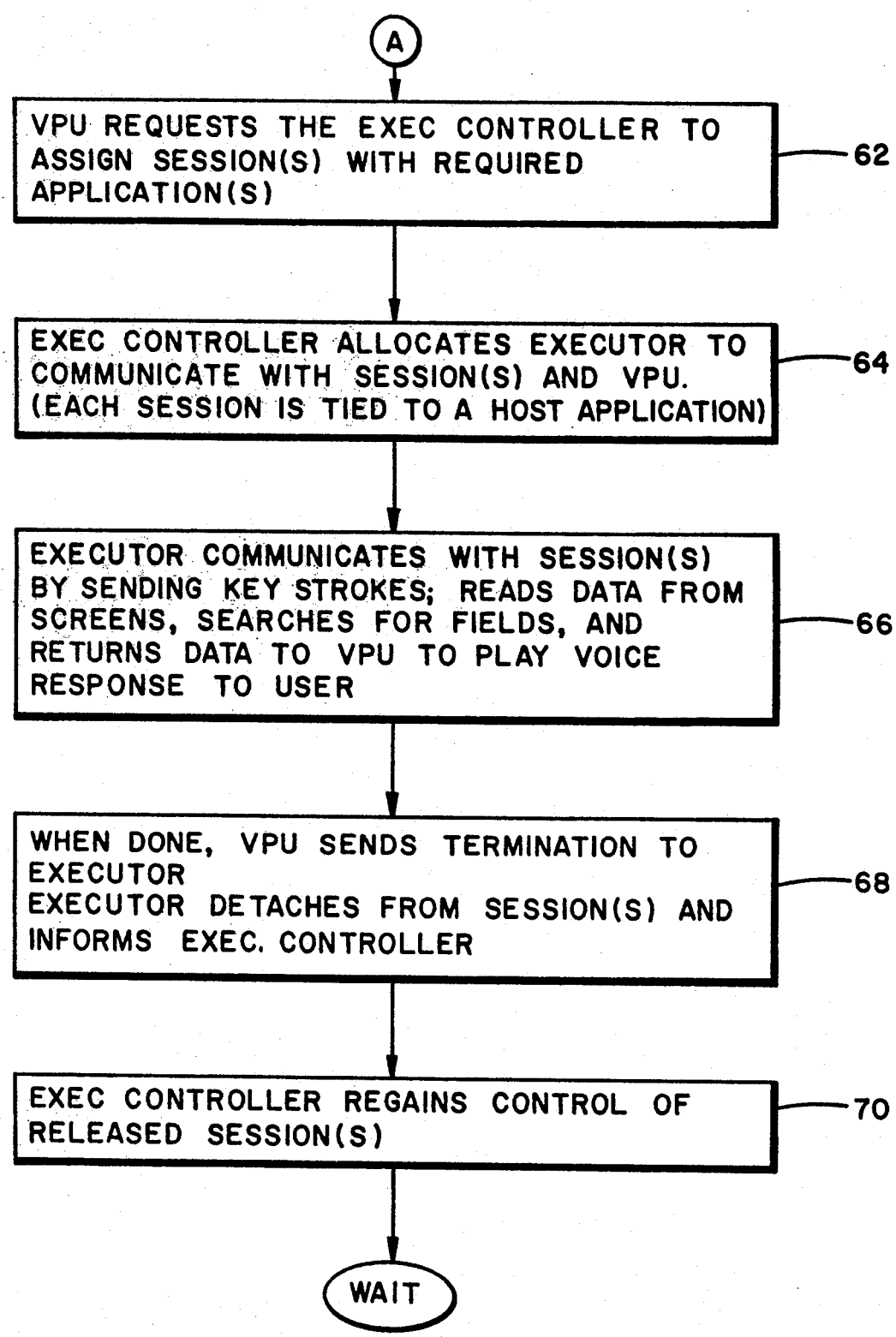

Referring now to FIGS. 3 and 4, a more detailed description of the operation of the system shown in FIGS. 1 and 2 will be provided. Initially, interface processor 10 is subjected to a preparation/training operation wherein a number of inputs are provided to enable system initialization. For instance, as shown in Box 50, the types of host applications, connection types, memory capacities, numbers of input telephone lines, etc. are input as initialization constants. Then, for each application (Box 54), log-in and log-out sequences are defined, the number of virtual terminal sessions are specified so as to respond to anticipated user calls; and a refresh procedure is established.

The refresh procedure provides interface processor 10 with the capability to maintain a virtual terminal session in operation and the associated application in a primed state. Without refresh, most applications will automatically terminate a session if no activity has occurred within a predetermined time. To prevent such a session termination, the refresh procedure maintains a time count and will, prior to time-out, generate a screen to the application which will reset its time-out and enable a continuance of the virtual session.

At the termination of the preparation/training interval, all of the inputted configuration data is saved in the database (Box 54) and the system is then prepared for operation. At initiation time (Box 56), executive control module 32 causes virtual terminal sessions module 38 to commence log-in procedures for all sessions defined in the database. Session control table 36 is updated with the current status of all sessions. At this point, the system is prepared for user inquiries.

Until a user inquiry is received (Box 58), controller 32 performs the refresh procedure to maintain the virtual sessions in effect and connected application in their primed states. In addition, all free virtual sessions are allocated for use by script executor module 34. As shown in Box 60, VPU control module 30 then receives a user inquiry, assigns it to a channel process submodule 31, which in turn, requests executive control module 32 to assign a virtual session or sessions for communicating with hosts containing the required application(s) (Box 62).

Executive control module 32 then allocates an executor submodule 35 to communicate with channel processor submodule 31 (Box 64). The assigned executor submodule 35 obtains assignment of a virtual session and proceeds to communicate with the connected host processor/application by sending keystrokes to the host processor. The application in the host immediately responds to the entered data and provides a response screen. Upon receiving the screen back from the host processor, executor submodule 35 reads the data from the screen by finding the requisite field and extracting the data. It then returns that data to channel process submodule 31 in VPU control module 30, where it is played out by voice to the user (Box 66).

It is to be understood that if the user provides a plurality of inputs that require plural applications, an assigned executor submodule 34 is allocated a plurality of virtual sessions, each session interacting with a host containing the required application. As a result, a single telephone inquiry can result in a plurality of applications providing information back to the user, thereby negating the need for multiple calls. Furthermore, since each host application is primed, extremely rapid responses to user inquiries are provided.

When all user transactions are finished, the channel process submodule 31 sends a termination indication to the assigned executor submodule 35 which then detaches from the session(s) and informs executive control module 32 of its termination of function. At this point, executive control module 32 regains control of the session(s) just released and updates session control table 36 to indicate that the sessions are available.

While the invention has been particularly shown and described with respect to a preferred embodiment thereof, it will be understood by those skilled in the art that changes in form and details may be made therein without departing from the scope and spirit of the invention.

What is claimed is:

1. A method for enabling rapid access from an interface processor to applications running on a plurality of host processors, each said host processor communicating with said interface processor by providing screens to said interface processor, a screen comprising a block of data which if provided to a display terminal would be displayed for user viewing, said method performed by said interface processor and comprising the steps of:

(a) establishing at least one virtual terminal session with each said host processor and initializing said applications running on said host processor to a ready state to ready said applications for further commands;

(b) responding to user input data that is interpreted as requiring a process to be performed by an application, by accessing a virtual terminal session with a host processor on which said application is running, entering user input data in a stored block of data comprising a screen from said application, and transmitting at least said user-input data to said host processor, whereby said host processor immediately processes said user input data; and (c) receiving in response to said user input data transmitted to said host processor in step b, a screen from said host processor containing reply data for said user, and transmitting said reply data to said user, whereby said interface processor enables a plurality of host processors to rapidly respond to user input data without requiring modification of host processor-controlling software.

2. The method as recited in claim 1 wherein step (b) includes the further steps of: p1 creating a table of host application/virtual terminal sessions;

updating said table to indicate available host application/virtual terminal sessions; and choosing from said table, an available host application/virtual terminal session in response to said user input data, whereby said user input data may be directed to an available host application virtual terminal session that is not already busy.

3. The method as recited in claim 2 wherein if, in step (b), said user input data is interpreted as requiring execution of a plurality of applications, said method includes the further steps of:

accessing a plurality of virtual terminal sessions, one for each application of said plurality of applications, and wherein step (c) extracts replay data from screens returned by said each said application and provides said reply data to the user in response to said user input data.

4. The method as recited in claim 1 including the further step of:

providing a refresh input to each said virtual terminal session and connected host processor, whereby an application on each said host processor is maintained in an initialized state.

5. A system for enabling rapid response to user telephone inquiries, said inquiries placed with an interface processor which, in turn, accesses applications running on a plurality of connected host processors, each host processor communicating with said interface processor through provided to a display terminal would be displayed for user viewing, said interface processor comprising:

channel process means for interacting with said user, for receiving user input and for providing a voice response to said user;

virtual terminal means for establishing a plurality of virtual terminal sessions, at least one session with each said host processor, for initializing an application on each said host processor to a ready state, and for storing at least an initial screen from each said application; and executor means responsive to user input data from said channel process means, to operate over an available virtual terminal session and to communicate with an initialized application on a host processor, said executor means providing user input data requested by a stored screen to said initialized application on said host processor, and for receiving a screen with reply data from said application on said host processor in response, and to provide said reply data to said channel process means, whereby said channel process means responds to said user with said reply data.

6. The system as recited in claim 5 wherein said interface processor further comprises: table means including a listing of host application/virtual terminal sessions; and control means for examining said table means and assigning an available virtual terminal session in response to user input data that is interpreted as requiring a process to be performed by an application.

7. The system as recited in claim 6 wherein said control means provides periodic inputs to said virtual terminal sessions to maintain said applications on said host processors in an initialized state if any said application is not accessed by user input data within a predetermined time period.

8. The system as recited in claim 7 wherein said channel process means includes voice response capability that orally responds to user input data.

9. The system as recited in claim 8 wherein said executor means responds to user input data requiring a plurality of applications, by assigning to a user who generates said user input data, a plurality of virtual terminal sessions with applications required to respond to said user input data.

10. The system as recited in claim 7 wherein said executor means further executes a stored script for causing reply data received in a first screen over one virtual terminal session from an application operating on a host processor, to be entered into a second screen received from another application, for transmission to a host processor over another virtual terminal session.

* * * * *

UNITED STATES PATENT AND TRADEMARK OFFICE
CERTIFICATE OF CORRECTION

PATENT NO. : 5,283,888

DATED : 2/1/94

INVENTOR(S) : Dao et al.

It is certified that error appears in the above-identified patent and that said Letters Patent is hereby corrected as shown below:

Col. 7, line 29, delete "pl".

Col. 8, line 2, after "provided" insert --screens, a screen comprising a block of data, which if --.

Col. 8, line 6, after "input" insert --data--.

Signed and Sealed this

Twenty-eighth Day of June, 1994

Attest:

BRUCE LEHMAN

Attesting Officer    Commissioner of Patents and Trademarks